(12) United States Patent
Cameron et al.

(10) Patent No.: US 8,100,074 B2
(45) Date of Patent: Jan. 24, 2012

(54) WET BUOYANCY ENGINE

(75) Inventors: Colin G. Cameron, Mt. Uniacke (CA); Jeffrey H. Smith, Halifax (CA)

(73) Assignee: Her Majesty the Queen in right of Canada, as represented by the Minister of Defense, Ottawa, Ontario (CA)

( * ) Notice: Subject to any disclaimer, the term of this patent is extended or adjusted under 35 U.S.C. 154(b) by 273 days.

(21) Appl. No.: 12/556,037

(22) Filed: Sep. 9, 2009

(65) Prior Publication Data

US 2010/0064958 A1    Mar. 18, 2010

(51) Int. Cl.
*B63B 39/03*    (2006.01)
(52) U.S. Cl. .................. 114/125; 114/333; 114/245
(58) Field of Classification Search .......... 114/121, 114/125, 333, 245
See application file for complete search history.

(56) References Cited

U.S. PATENT DOCUMENTS

| 4,274,405 | A | * | 6/1981 | Schmidt et al. | .......... 128/205.26 |
| 4,364,325 | A | * | 12/1982 | Bowditch | .................. 114/331 |
| 6,425,552 | B1 | * | 7/2002 | Lee et al. | .................. 244/97 |

* cited by examiner

*Primary Examiner* — Stephen Avila
(74) *Attorney, Agent, or Firm* — Ade & Company Inc; Michael R. Williams

(57) ABSTRACT

Technologies such as stealth buoys and underwater gliders need to modify their own buoyancy in order to operate. Strategies such as pumping fluid are typically used to change the device's net volume. This in turn requires a mechanically sophisticated apparatus, increasing the cost of the vehicle while diminishing its reliability. The concept of a buoyancy engine that exploits the enormous volume and pressure changes accompanying the reversible electrochemical interconversion of water to hydrogen and oxygen gases is applied to stealth buoys and underwater gliders.

10 Claims, 3 Drawing Sheets

WET BUOYANCY ENGINE

BACKGROUND OF THE INVENTION

Technologies such as stealth buoys and underwater gliders need to modify their own buoyancy in order to operate. Strategies such as pumping fluid are typically used to change the device's net volume. This in turn requires a mechanically sophisticated (and consequently expensive) apparatus. This document introduces the concept of a buoyancy engine that exploits the enormous volume and pressure changes accompanying the reversible electrochemical interconversion of water to hydrogen and oxygen gases. Named the Water Electrolytic Transformation (WET) buoyancy engine, this device promises to deliver a new, efficient, and very inexpensive means to control buoyancy in remote sensing and surveillance devices.

Stealth buoys are surveillance devices that record data while they lie on the ocean floor where they are virtually undetectable and are less prone to drifting problems. When it becomes necessary to notify its deployer, the buoy inflates an elastic collar and rises to the surface in order to transmit its data to some receiving station. It then retracts the collar and descends to the bottom where it gathers new data. These buoys have obvious military applications such as tracking hostile ships and submarines, but also civilian applications such as detection of smuggling and monitoring marine life.

Underwater gliders are autonomous submarine vehicles that direct vertical force (buoyancy) to horizontal translation using wings. These devices have been showing promise in recent years as a means of collecting oceanographic data inexpensively (Rudnick et al., 2004, Marine Technology Society Journal 38: 73-84). There also exists the military potential for using fleets of gliders for autonomous remote sensing and surveillance over a large patrol area.

U.S. Pat. No. 5,596,943, entitled 'Apparatus and method for floating a towed device from a submerged vehicle' teaches a method of surfacing a vehicle towed by a submerged vehicle by displacing water from within the towed vehicle with gases evolved by electrolysis. The towed vehicle has interior balloons or bladders for capturing evolved gases which are situated such that when empty, the towed vehicle is neutrally buoyant. As the internal bladders fill with evolved gases, positive buoyancy is produced, causing the towed vehicle to surface. Thus, this patent in effect teaches a method for modifying the hydrodynamic properties of a towed body.

Published US Patent Application 2008/0088133 entitled 'Wave activated power generation device and wave activated power generation plant' teaches a wave activated power generation device comprising a cylindrical floating body anchored on water and extending in a vertical direction relative to a surface of the water which includes a buoyancy control chamber that allows the floating body to vertically float in the water so as to adjust its position relative to the surface of the water. The floating body includes an air chamber and an air turbine which converts air flow into electrical power. Thus, this document in effect describes a method for harvesting energy from waves and wind by adjusting the position of the apparatus to an optimal depth.

It is important to remember that air is a fluid, as is sea water, and buoyancy is simply the difference in weight between an object and the volume of surrounding media it displaces. Since water is denser than air, it provides a much greater buoyant force for a given volume.

SUMMARY OF THE INVENTION

According to a first aspect of the invention, there is provided a method for effecting generally vertical movement of a vessel within a body of water comprising:

providing a vessel comprising a housing containing a buoyancy engine, the engine comprising a compartment within the housing for storing water therein, said compartment having a water valve for allowing water into the water storage compartment and a gas valve for allowing gas to exit the water storage chamber;

a source of electrical energy external to the water storage compartment and a pair of electrodes electrically connected to the electrical energy source and positioned within the water storage compartment;

placing the vessel into a water column;

decreasing the buoyancy of the vessel by opening the water valve such that water enters the water storage chamber via the water valve and gas escapes the water storage chamber via the gas valve;

closing the water valve and the gas valve once the vessel has reached a first depth within the water column; and increasing the buoyancy of the vessel by electrolyzing a quantity of the water within the water storage chamber thereby generating hydrogen and oxygen gases which are retained, thereby increasing the buoyancy of the vessel and causing the vessel to rise to a second depth within the water column.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Technologies such as stealth buoys and underwater gliders need to modify their own buoyancy in order to operate. Strategies such as pumping fluid are typically used to change the device's net volume. This in turn requires a mechanically sophisticated apparatus, increasing the cost of the vehicle while diminishing its reliability.

Described herein is the concept of a buoyancy engine that exploits the enormous volume and pressure changes accompanying the reversible electrochemical interconversion of water to hydrogen and oxygen gases.

Described herein is a Water Electrolytic Transformation (WET) buoyancy engine which provides a new, efficient, and very inexpensive means to control buoyancy in remote sensing and surveillance equipment. This in turn can be used for the production of inexpensive, disposable devices for numerous applications, such as the monitoring of shipping activity to early warning sensors for force protection in potentially hostile harbours. This buoyancy engine boasts the additional advantage of interfacing well with environmental energy harvesting concepts.

To change its buoyancy, any underwater vehicle must necessarily change its density. Since it is not practical to change mass, a net change in volume is needed. Typically, this volume change is accomplished by pumping fluid to and from bladders or tanks. Described herein is an alternative electrochemical approach, named the Water Electrolytic Transformation (WET) buoyancy engine.

Figure 1:
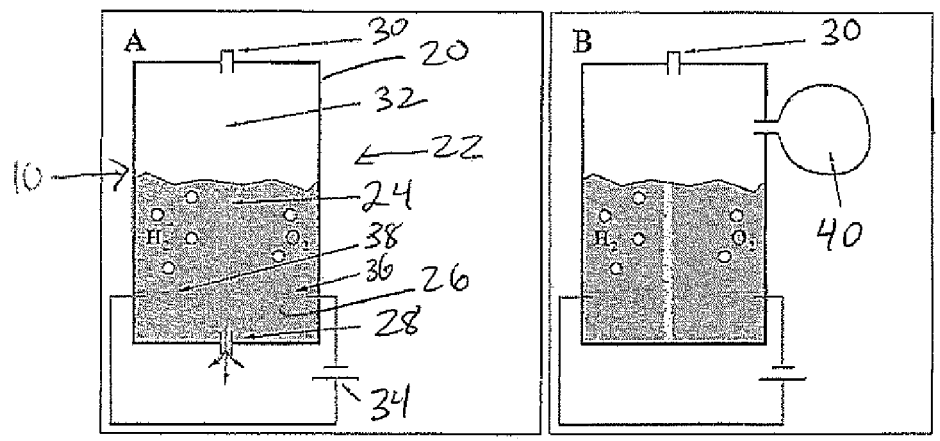
FIG. 1 shows an overview of a single compartment WET buoyancy engine.

As shown in FIG. 1, in some embodiments, there is provided a method for effecting generally vertical movement of a vessel within a body of water comprising:

providing a vessel 10 comprising a housing 20 containing a buoyancy engine 22, the engine 22 comprising a compartment 24 within the housing 20 for storing water 26 therein, said compartment having a water valve 28 for allowing water into the water storage compartment 24 and a gas valve 30 for allowing headspace gas 32 to exit the water storage chamber;

a source of electrical energy 34 external to the water storage compartment 24 and a pair of electrodes (anode 36 and cathode 38) electrically connected to the electrical energy source 34 and positioned within the water storage compartment 24;

placing the vessel into a water column;

decreasing the buoyancy of the vessel by opening the water valve 28 such that water enters the water storage chamber 24 via the water valve 28 and headspace gas 32 escapes the water storage chamber 24 via the gas valve 30;

to note that in other embodiments, the housing may be arranged such that bladders are arranged to collect oxygen and hydrogen gas evolved separately from the respective subchambers.

As will be appreciated by one skill in the art, the use of bladders would provide a sealed system, where no new sea water (i.e., salt water) would need to enter the device in the course of its operation, which may help avoid contamination. However, it is important to note that bladders would not specifically affect the buoyancy or energy recovery.

As discussed herein, in some embodiments, the WET buoyancy engine includes a fuel cell for the recapture of the energy expended during electrolysis. In some embodiments, the WET buoyancy engine may include a single battery that drives the electrolysis and powers the instruments and also stores the energy recaptured by electrolysis. In other embodiments, there may be separate batteries for the electrolysis and for the sensors. In other embodiments, devices that collect energy from the environment known in the art, for example, solar panels when surfaced and/or a water turbine when submerged, may be added to recharge the battery/batteries.

Sensors included in the stealth buoy include but are by no means limited to acoustic sensors and electromagnetic detectors. As will be apparent to one of skill in the art, the stealth buoy must include a communication device for communicating when the device is surfaced. Radio waves are attenuated by water, which means that any kind of underwater communication would need to be done by an underwater modem.

It is also of note that the engine's electrodes may be used as a depth gauge, since the voltage of the water-gas reaction depends on pressure. As will be known to one of skill in the art, it is possible to estimate the depth of the vehicle on the basis of the pressure exerted by the surrounding water on the gases, since the "open circuit potential" (which means voltage at zero current) will change accordingly.

It is of note that while the stealth buoy incorporating the WET buoyancy engine may be used at any depth, in terms of targeted operation, relatively shallow near-shore waters such as harbours, bays and the like are probably the most likely.

Generally speaking, any unanchored body in the water will drift with the current (or under the influence of surface winds, if appropriate). Accordingly, the stealth buoys are arranged to sit on the bottom of the body of water while they gather information.

Figure 3:
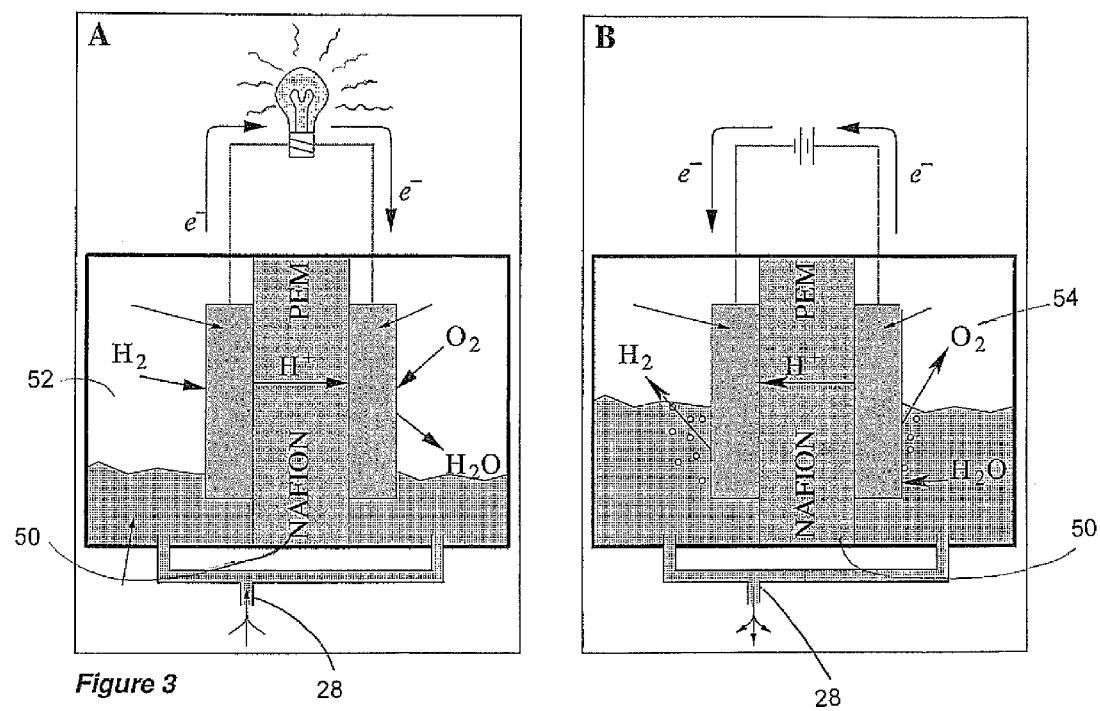
FIG. 3 is a schematic diagram showing regenerative fuel cell operation.

In some embodiments, for example, as shown in FIG. 3, the WET buoyancy engine further comprises a regenerative fuel cell. In these embodiments, the barrier 50 discussed above is a proton exchange membrane fuel cell as known in the art. In these embodiments, the oxygen and hydrogen gases are physically separated by a membrane that allows the passage of protons only between the oxygen subchamber 54 and the hydrogen subchamber 52. In the example illustrated in panel A and discussed below, water is produced from oxygen and hydrogen gases and electrical power is generated; in the example illustrated in panel B, application of external voltage, for example, stored electrical energy, drives the fuel cell in the reverse direction, producing oxygen and hydrogen gas from water, that is, in the reverse direction from panel A (electrolysis).

Electrolytic phase transformation was first reported several years ago as an alternative materials-based actuation strategy (Cameron and Freund, 2002, PNAS USA 99:7827-7831; Cameron and Freund, 2003, Chem Eng Technol 26: 1007-1011; Cameron and Freund, 2003, Proc SPIE 4878: 14-20) This technology exploits the enormous pressure and volume changes that accompany the electrochemical interconversion between liquid water and hydrogen and oxygen gases:

$$\text{energy} + 2H_2O(l) \leftrightarrow 2H_2(g) + O_2(g) \tag{1}$$

Expressed as the two constituent half-cell reactions, (one occurring at each of two electrodes)

$$2H_2O(l) \leftrightarrow 4H^+(aq) + O_2(g) + 4e^- \tag{2}$$

$$4H^+(aq) + 4e^- \leftrightarrow 2H_2(g) \tag{3}$$

This implies that two molecules of water may be converted to three molecules of gas, reversibly, with an accompanying flow of four electrons through an external circuit. This reaction occurs with a thermodynamic potential of 1.23 V (Bard and Faulkner, 2001 in Electrochemical Methods, $2^{nd}$ ed). The reversibility of the reaction should be emphasized; the generation of gas requires the input of electrical energy, but the recombination is spontaneous and will produce electrical energy under particular circumstances, i.e., a fuel cell.

The behaviour of the generated gases can be well described by the ideal gas law:

$$PV = n_g RT \tag{4}$$

where P and V are the pressure and volume of $n_g$ moles of gas at temperature T, and R=8.3145 m³ Pa mol⁻¹ K⁻¹ is the gas constant.

The volume $V_w$ of $n_w$ moles of pure water (density p=1.00 g/mL and molecular weight $M_w \approx 18$ g/mol) is easily calculated:

$$V_w = n_w \times M_w / p \tag{5}$$

The reaction stoichiometry of Equation 1 indicates that 3 moles of gas will arise from the electrolysis of 2 moles of water. Invoking the ideal gas law (Equation 4), the volume of gas $V_g$ resulting from the electrolysis of $n_w$ moles of water is:

$$V_g = (3/2) n_w RT / P \tag{6}$$

The engine's buoyancy arises from the weight of water the gas can displace. Since $V_g \gg V_w$ ($V_g/V_w \approx 1360$ at ambient temperature and pressure), the volume of water consumed can be neglected (and this may not be a consideration anyway, depending on the device configuration). Keeping in mind that the total pressure experienced by the engine is equal to the sum of atmospheric and water depth pressures ($P_{atm}$ and $P_{water}$ respectively) and that four moles of electrons $n_e$ are required to create three moles of gas (see Equations 2 and 3), an expression relating the buoyant force B of a WET buoyancy engine device with electrical charge Q may be derived from Equation 6 and Faraday's constant $F=9.54\times10^4$ C mol$^{-1}$:

$$B \approx V_g p / g \quad (7)$$

$$= \frac{(3/2)n_w RTp}{(P_{atm} + P_{water})g} \quad (8)$$

$$= \frac{(3/4)n_e RTp}{(P_{atm} + P_{water})g} \quad (9)$$

$$= \frac{(3/4)QRTp}{(P_{atm} + P_{water})Fg} \quad (10)$$

For simplicity, force due to gravity $g=9.8$ N kg$^{-1}$ may be omitted to express buoyancy in, for example, grams-force instead of Newtons.

Since its operation is governed by the ideal gas law (Equation 4), the WET buoyancy engine response is pressure and temperature dependent. At greater depths and colder temperatures, more electrical energy is required to reach a given buoyancy; the buoyancy will increase as a WET buoyancy engine equipped vehicle ascends.

Stealth buoys are autonomous vehicles to transport sensor packages in an aquatic environment, and have the unique ability to change their own buoyancy. Doing so allows the vehicle to lie on the ocean floor and gather data over extended periods of time without detection and without suffering significantly from drift due to ocean currents. The data may include (i) acoustic information that identifies shipping and boat traffic, fishing, marine wildlife, (ii) electromagnetic information that identifies shipping and/or enemy military activity, (iii) oceanographic or seismic records, and (iv) any other information corresponding to the sensor suite deployed on the vehicle. When some condition is met, e.g., after a fixed period, or after some particular event has been detected, the buoy's logic circuitry instructs the engine to increase buoyancy so that the vehicle can rise to the surface, where it can upload its information via a radio link, or simply be collected for analysis and redeployment. Depending on the buoy's logic program, the vehicle may then be instructed to descend, and begin the cycle again.

Table 1 outlines the relationship between electrical energy at varying depths of sea water (p=1.03 g ml-1) to reach an arbitrary 1 g of buoyant force. This assumes a driving voltage of 1.5 V, a water temperature of 10° C., and a pressure increase of 10.08 kPa m$^{-1}$. For reference, a rechargeable 1.2 V 9500 mAh NiMH D-cell contains around 34.2 kC of charge and approximately 41 kJ of energy.

TABLE 1

Theoretical charge and energy requirements per gram of buoyant force at various depths, and the corresponding buoyant force that can be achieved by the energy of single D-cell

| Depth (m) | Pressure (Pa) | Charge (C) | Energy (J) | Buoyancy per D-cell (g) |
|---|---|---|---|---|
| 0 | $1.01 \times 10^5$ | 5.28 | 7.93 | $5.17 \times 10^3$ |
| 1 | $1.11 \times 10^5$ | 5.81 | 8.71 | $4.70 \times 10^3$ |
| 10 | $2.02 \times 10^5$ | 10.5 | 15.8 | $2.59 \times 10^3$ |
| 100 | $1.11 \times 10^6$ | 57.9 | 86.8 | $4.72 \times 10^2$ |
| 1000 | $1.02 \times 10^7$ | 540 | 811 | $5.06 \times 10^1$ |

Figure 2:
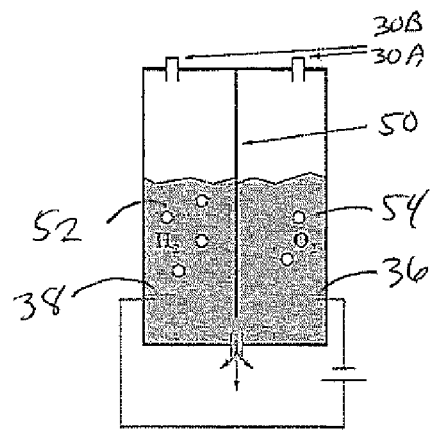
FIG. 2 shows a double compartment WET buoyancy engine.

As will be apparent to one of skill in the art, the electrolysis cell is simple in design. A simple two-electrode configuration is satisfactory as there is no need for a precise measurement of electrode potentials, and hence a three-electrode cell is not required. Three fundamental design concepts are illustrated in FIGS. 1 and 2 in order of increasing complexity. The key issues are: rigid compartment vs. bladder, and mixed vs. separated gases. For example, while electrodes made from platinum or palladium would offer superior electrochemical kinetics for the electrolysis reaction, less expensive materials (e.g., stainless steel or carbon) may also be used with satisfactory results.

The fundamental operation of these devices is straightforward, as illustrated in FIG. 1. The pressure of gases resulting from the application of electrical current can be employed to change the density of the device either through expelling water from the system, or through inflating a float bladder. In the former case, sea water would be used as the electrolysis medium. In the latter, only on-board water could be used which may be useful in scenarios where salt water is undesirable, or if a low solution pH is desired. As will be appreciated by one of skill in the art, in those embodiments incorporating bladders, internal water is not expelled. Possible advantages of this arrangement are: (i) purer water used for electrolysis, avoiding possible contamination, and (ii) operation in fresh water (e.g., a lake) which may not be 'salty' enough for the electrolysis. After the WET buoyancy engine powered vehicle has surfaced, resubmerging is easily done by simply venting the gases.

A slightly more sophisticated design involves a physical barrier separating the hydrogen and oxygen gases, as shown in FIG. 2. This configuration is somewhat safer, avoiding a potentially reactive combination of gases. The separation leads to the possibility of recapturing the chemical energy in a controlled manner. There must be some provision of ionic transport between the two compartments. This can be a simple hole, a porous material (e.g., fritted glass) or a membrane.

The electrochemical reaction of hydrogen and oxygen forms the basis of the hydrogen fuel cell, a concept of enormous economic importance. Already prototype vehicles based on Proton Exchange Membrane (PEM) fuel cells are being demonstrated.

The reaction in question is the same as presented earlier (see Equation 1), but in the direction opposite to electrolysis. The reaction is exothermic and spontaneous on a catalyst surface. By separating the half-reactions, it is possible to recover the chemical energy in the form of electricity. FIG. 3a illustrates the PEM fuel cell. At the heart of this device lies a membrane that permits the passage of protons only. This serves to keep the electrochemical half-reactions separated. Hydrogen arriving at the anode (typically made of platinum or a platinum alloy) and is oxidized to free protons. The protons pass through the membrane, while the associated electrons are forced to pass through an external electrical circuit. The electron then reach the cathode (often containing platinum or platinum-ruthenium alloys), where they combine with the protons and oxygen gas, forming water. The reaction continues spontaneously until the fuel is exhausted or the external electrical circuit is interrupted.

The same cell can be operated in reverse, FIG. 3b, which is the familiar electrolysis reaction. Such a device operated both directions is a called a regenerative fuel cell (RFC), and is a useful means of storing energy. RFC units store surplus energy collected in daylight for night operation. The theoretical cycle efficiency of charging and discharging a RFC is approximately 80%.

The interconversion of gases and electrical energy has previously been demonstrated as an actuation strategy (Cameron and Freund, 2002; Cameron and Freund, 2003; Cameron and Freund, 2003). Here, the interconversion can be exploited to control buoyancy reversibly and precisely. Being based on the same principles as RFCs, the WET buoyancy engine provides highly efficient operation, since part of the energy expended during the gas generation stage can be recovered in the reverse step. Furthermore, since this engine is in effect an energy storage device, it is very well suited to operating in conjunction with environmental energy harvesting schemes.

The WET buoyancy engine stands out for its simplicity. The lack of moving parts (other than a vent valve if so configured) implies operational robustness and inexpensive assembly; a working engine can be built for dollars. Accordingly, the WET buoyancy engine is ideal for autonomous and disposable applications.

WET buoyancy engine technology is also well suited to driving inexpensive stealth buoys. A buoy deployed on the ocean bed could be made positively buoyant through the electrolysis reaction. After the buoy has completed its radio transmission at the surface, venting the gas would cause the device to sink once again. As an example, using the information from Table 1, a stealth buoy lying on the sea bed at a depth of 100 m and needing 20 g of buoyant force to start its ascent would need roughly 1.7 kJ of energy input. A single D-cell could provide sufficient energy to power at least 24 cycles. A regenerative system could improve this figure: reacting the gases in a RFC configuration would recoup a significant fraction of the energy. The current work on 11 kg A-size sonobuoys suggests that a minimum of 1.2 L of water displacement should be effected to lift the device off the bottom. From a 100 m deployment, the energy content of 2.5 D-cells would be expended per ascent. Realistically, an energy recapture scheme should lower this to between one (representing 60% recapture) and two (20% recapture) D-cells.

Alternatively, an energy harvesting scheme could be used to drive the electrolysis reaction, allowing indefinite operation of the buoyancy engine. A simple turbine attached to a small DC generator would suffice to convert the kinetic energy of water due to tidal flow. For a turbine with rotor diameter r in water flowing with a current v, it is easy to derive an expression for kinetic energy E per unit time t:

$$E/t = (1/2) p \pi t r^2 v^3 \quad (11)$$

As an example using real-world parameters, the predicted peak tidal current flow in Halifax harbour ranges from around 0.34 m/s (0.22 m/s average) under the MacDonald bridge to around 0.10 Ws (0.064 m/s average) in the vicinity of the anchorage between George's and McNab's islands (an area commonly used by visiting aircraft carriers). Assuming a generator with a turbine around the size of a compact disc (6 cm radius), in one 24-hour period over 1.6 kJ could be collected from tidal flow under the MacDonald bridge. Assuming an overall conversion efficiency of only 30%, such a device could provide 20 g of buoyant lift to a stealth buoy sitting on the bottom (around 20 m deep) every 24 hours.

Underwater gliders travel through the water by changing their buoyancy to generate net upwards or downwards force accordingly. The force is translated to horizontal motion by the glider's "wings". The buoyancy change is accomplished by the glider changing its internal volume typically on the order of 100 cm$^3$ via the pumping of fluids, and attitude is controlled by shifting internal weights (usually the battery tray).

Figure 4:
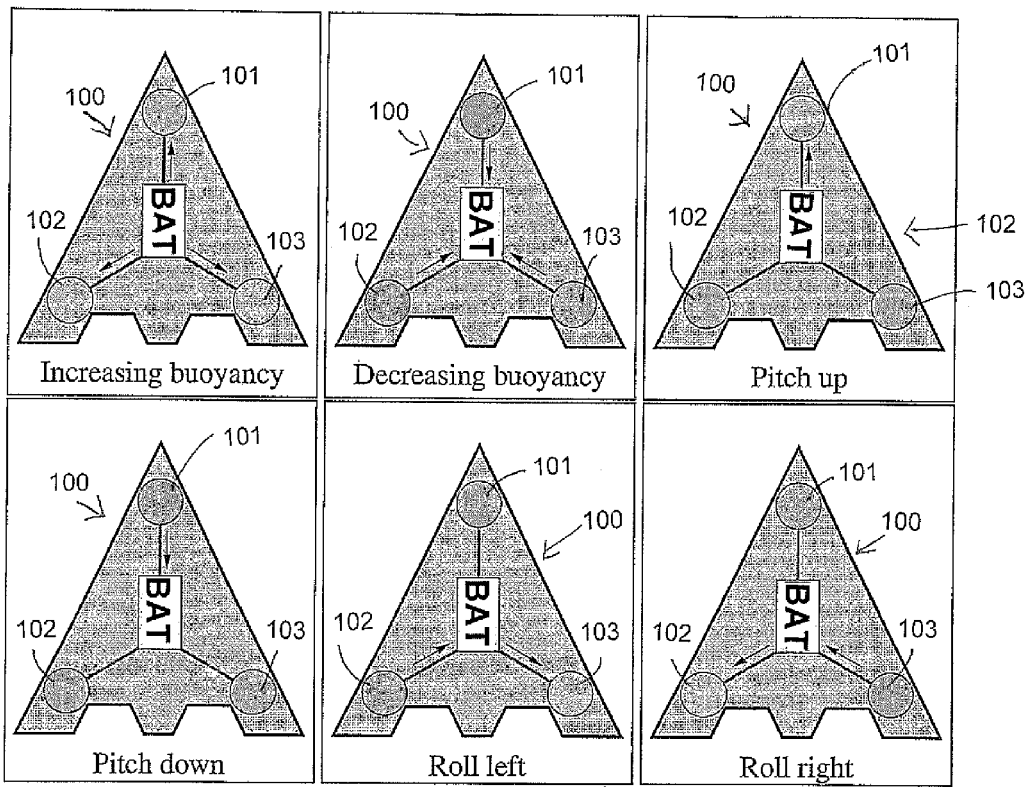
FIG. 4 is a diagram illustrating the operation of underwater gliders incorporating WET buoyancy engines.

First, the energy consumption in the conventional gliders to reach a certain buoyancy is not strongly dependent on depth, since the same quantity of fluid will be pumped under all conditions. This is reflected in the poor efficiencies at shallower cycles. It can be concluded then that many of these gliders are inefficient for operations in other than deep sea conditions. Consequently, they are ineffective for the littoral applications that would be most useful for surveillance and reconnaissance. The WET buoyancy engines consume energy proportional to depth, and are therefore more efficient in shallower waters. A glider propelled by a WET buoyancy engine would be ideal for military operations. One arrangement for a WET buoyancy engine-based stealth glider is shown in FIG. 4. In this embodiment, the underwater glider 100 comprises three WET buoyancy engines 101, 102, 103, specifically, one self-contained regenerative buoyancy engine in the nose 101 and one in each wing 102 and 103 and connected to a single power source (BAT). As can be seen in the individual panels, the buoyancy of the underwater glider can be increased by effecting electrolysis (generating oxygen and hydrogen gases) in all three buoyancy engines 101, 102, 103 while buoyancy can be decreased by reversing the electrolysis process in all three buoyancy engines 101, 102, 103. The glider can be pitched up or down by either effecting electrolysis or reversing electrolysis respectively within the buoyancy engine in the nose 101. Similarly, the underwater glider can be rolled left or right using the buoyancy engines in the wings, as shown in FIG. 4. Specifically, a right roll uses activation of 101 and 103 whereas a left roll uses activation of 101 and 102.

Second, the cost (and, presumably, reliability) of the vehicles is largely a reflection of their mechanical nature. Pumps to change buoyancy and screw motors to change centre of gravity add expense and complexity to the apparatus. The WET buoyancy engine has no moving parts. Buoyancy can be controlled by one cell. Pitch and roll can be controlled with two additional independent cells. Using regenerative cells, buoyancy, pitch, and roll (and thus yaw) can be controlled as a self-contained system, with "pumping" achieved by electrical means, as illustrated in FIG. 4 and as discussed above. In this arrangement, the battery can be thought of as a reservoir for the electricity-gas equivalency.

It is of note that other suitable arrangements of WET buoyancy engines for an underwater glider will be readily apparent to one of skill in the art and are within the scope of this invention. That is, the three WET buoyancy engine underwater glider is an illustrative example and does not necessarily limit the invention.

In use, the glider may initially sit flat on the surface, positively buoyant. For use, the underwater glider changes its overall buoyancy so it sinks slowly. Now, if the glider pitches its nose down slightly, some of the vertical motion will be translated to horizontal motion. In this manner, the underwater glider moves downward like a bird or plane gliding down towards the ground but with a significant horizontal component to its motion owing to the effect of the wing. Now if the glider changes its buoyancy to become slightly positive, and tilts its nose up, it will float upwards, but the wing effect will cause the vehicle to travel horizontally at the same time.

Underwater gliders are autonomous underwater vehicles designed to travel great distances underwater through changes in net buoyancy and pitch and/or roll angles. These vehicles too are used to carry sensor packages, and are frequently used to gather oceanographic data. Currently, both stealth buoys and gliders rely on complicated, expensive engines to change their buoyancy. The WET engine introduces a simple, inexpensive, and energy-efficient means to effect buoyancy changes, leading to the possibility of inexpensive—perhaps disposable—stealth buoys and underwater gliders.

One further advantage of using RFC WET buoyancy engine units as shown in FIG. 4 is that gas can be continuously reconsumed during the ascent in order to maintain constant buoyancy. Additionally, the cell open circuit voltage will be proportional to the gas pressure, in accordance with the Nernst equation (Bard and Faulkner, 2003). Therefore, the RFC could serve as a redundant depth gauge.

Buoyancy control is a key element to the operation of autonomous underwater vehicles. Stealth buoys and underwater gliders cannot function without a means of increasing and decreasing their buoyancy, usually by means of pumping fluids.

The Water Electrolytic Transformation buoyancy engine exploits an electrochemical reaction to achieve buoyancy changes. This approach is very efficient, especially in depths associated with littoral waters, and is also silent. It uses no moving parts, and is consequently extremely reliable. It is also very inexpensive to construct and uses no toxic materials. Furthermore, it lends itself well to scaling, which indicates that much smaller devices could be deployed.

Because of their simplicity, WET buoyancy engines are an attractive replacement for the engines that currently drive stealth buoys and underwater gliders.

While the preferred embodiments of the invention have been described above, it will be recognized and understood that various modifications may be made therein, and the appended claims are intended to cover all such modifications which may fall within the spirit and scope of the invention.

REFERENCES

1. Rudnick, D. L., Davis, R. E., Eriksen, C. C., Fratantoni, D. M., and Perry, M. J. (2004). Underwater gliders for ocean research. *Marine Technology Society Journal*, 38, 73-84.
3. Cameron, C. G. and Freund, M. S. (2002). Electrolytic actuators: Alternative, high-performance, material-based devices. *Proc. Natl. Acad. Sci. U.S.A.*, 99, 7827-7831.
4. Cameron, C. G. and Freund, M. S. (2003). Reversible and efficient materials-based actuation by electrolytic phase transformation. *Chem. Eng. Technol.*, 26, 1007-1011.
5. Cameron, Colin G. and Freund, Michael S. (2003). Electrolytic phase transformation actuators. *Proc. SPIE*, 4878, 14-20.
6. Bard, Allen J. and Faulkner, Larry R. (2001). Electrochemical Methods, 2 ed. Wiley.
7. Eriksen, C. C., Osse, T. J., Light, R. D., Wen, T., Lehman, T. W., Sabin, P. L., Ballard, J. W., and Chiodi, A. M. (2001). Seaglider: A long-range autonomous underwater vehicle for oceanographic research. *IEEE J. Ocean. Eng.*, 26, 424-436.
8. Sherman, J., Davis, R. E., Owens, W. B., and Valdes, J. (2001). The autonomous underwater glider "spray". *IEEE J. Ocean. Eng.*, 26, 437-446.
9. Webb, D. C., Simonetti, P. J., and Jones, C. P. (2001). SLOCUM: An underwater glider propelled by environmental energy. *IEEE J. Ocean. Eng.*, 26, 447-452.

The invention claimed is:

1. A method for effecting generally vertical movement of a vessel within a body of water comprising:
   providing a vessel comprising a housing containing a buoyancy engine,
   the buoyancy engine comprising a compartment within the housing for storing water therein, said compartment having a water valve for allowing water into the water storage compartment and a gas valve for allowing gas to exit the water storage chamber; and
   a source of electrical energy external to the water storage compartment and a pair of electrodes electrically connected to the electrical energy source and positioned within the water storage compartment;
   placing the vessel into a water column;
   decreasing the buoyancy of the vessel by opening the water valve such that water enters the water storage chamber via the water valve and gas escapes the water storage chamber via the gas valve;
   closing the water valve and the gas valve once the vessel has reached a first depth within the water column; and
   causing the vessel to rise to a second depth within the water column by increasing the buoyancy of the vessel by electrolyzing a quantity of the water within the water storage chamber thereby generating hydrogen and oxygen gases which are retained, thereby increasing the buoyancy of the vessel.

2. The method according to claim 1 wherein connected to the gas valve is a bladder for retaining said gases.

3. The method according to claim 2 wherein the bladder is external to the housing.

4. The method according to claim 1 wherein the water storage compartment is separated into an oxygen chamber and a hydrogen chamber by a barrier and the oxygen chamber comprises the anode of the electrolysis device and the hydrogen chamber comprises the cathode of the electrolysis device.

5. The method according to claim 1 wherein the vessel includes acoustic sensors or electromagnetic sensors.

6. The method according to claim 1 wherein the buoyancy of the vessel is decreased until the vessel rests on the bottom of the body of water.

7. The method according to claim 1 wherein the buoyancy of the vessel is increased until the vessel floats on the surface of the body of water.

8. The method according to claim 4 wherein the barrier comprises a fuel cell for recovering energy from electrolysis.

9. The method according to claim 8 wherein the fuel cell is connected to the source of energy.

10. A method for effecting generally vertical movement of a vessel within a body of water comprising:
   providing a vessel comprising a housing containing a buoyancy engine,
   the buoyancy engine comprising a compartment within the housing for storing water therein, said compartment having a water valve at a base thereof for allowing water into the water storage compartment, said compartment including a barrier which separates the compartment into a hydrogen chamber and an oxygen chamber, said hydrogen chamber comprising a hydrogen gas valve for releasing hydrogen gas from the water storage compartment, said oxygen chamber comprising an oxygen gas valve for releasing oxygen gas from the water storage compartment, said barrier comprising a fuel cell;

a source of electrical energy external to the water storage compartment and a pair of electrodes electrically connected to the electrical energy source and positioned within the water storage compartment such that the cathode of the electrolysis device is in the hydrogen chamber and the anode of the electrolysis device is in the oxygen chamber; and a plurality of sensors powered by the source of electrical energy;

placing the vessel into a water column;

decreasing the buoyancy of the vessel by opening the water valve such that water enters the water storage chamber via the water valve and gas escapes the water storage chamber via the gas valves until the vessel rests at the bottom of the body of water;

carrying out readings within the body of water via the sensors;

in response to a specific condition being met, increasing the buoyancy of the vessel by electrolyzing a quantity of the water within the water storage chamber thereby generating hydrogen and oxygen gases which are retained, thereby increasing the buoyancy of the vessel and causing the vessel to rise to the surface of the body of water, wherein some of the energy of electrolysis is recovered by the fuel cell and is transferred to the source of electrical energy and stored.

* * * * *